May 7, 1946.   W. J. PODBIELNIAK   2,400,021
FRACTIONATING COLUMNS
Filed Sept. 2, 1941   5 Sheets-Sheet 5
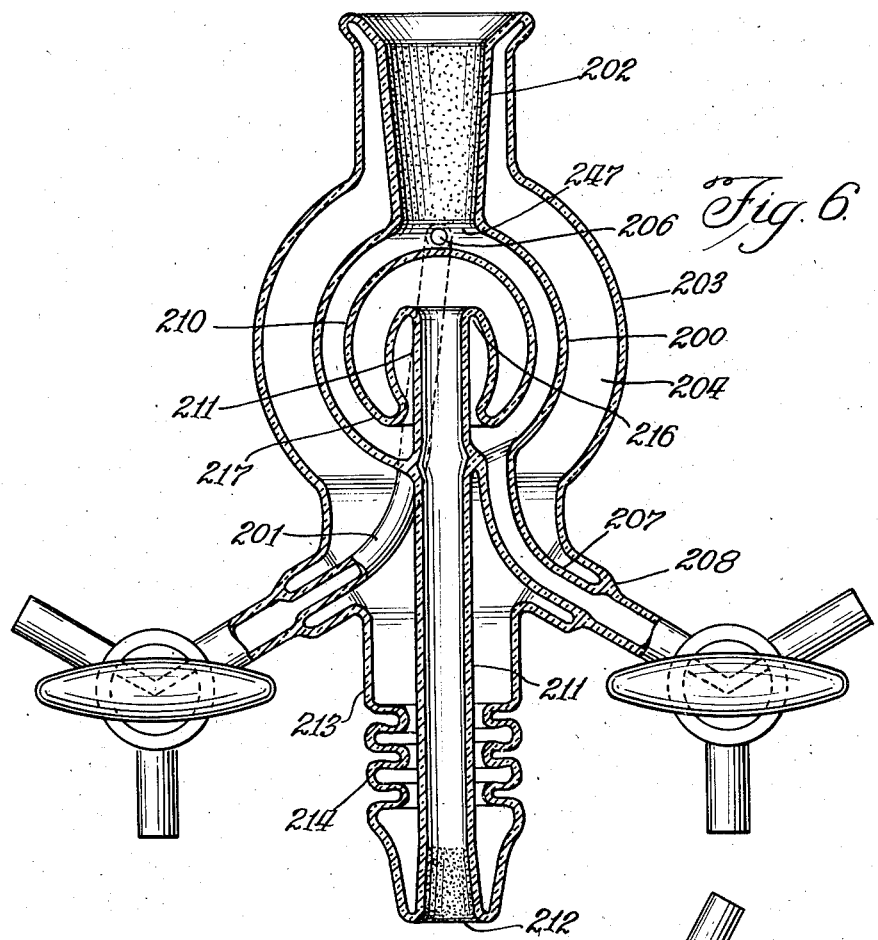
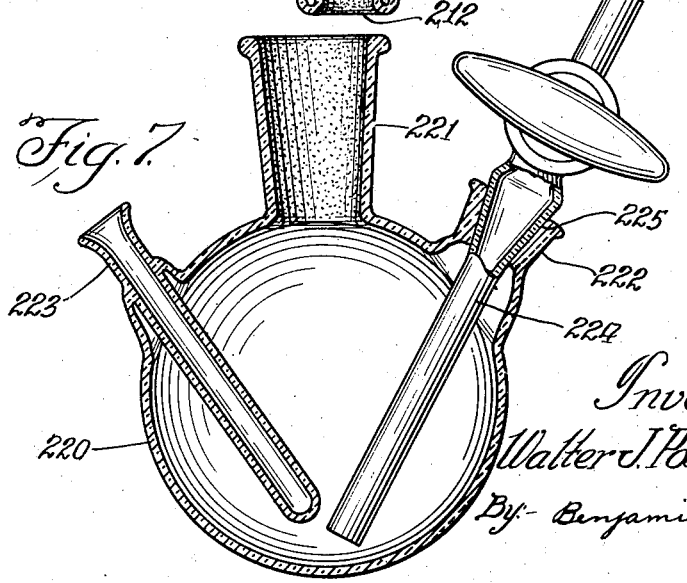

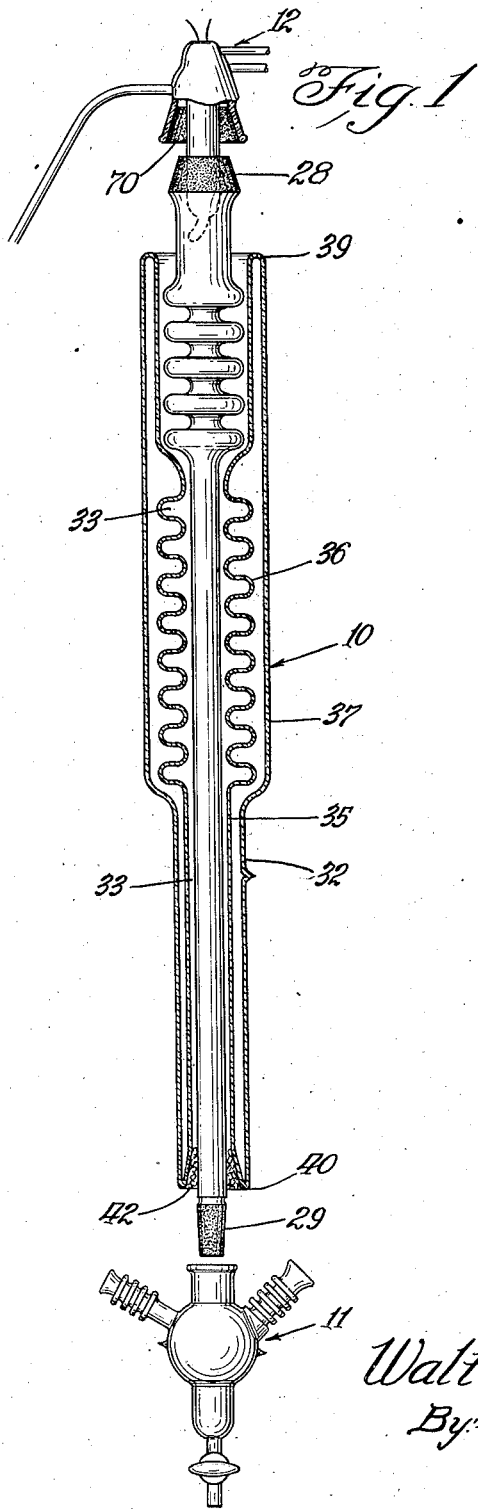
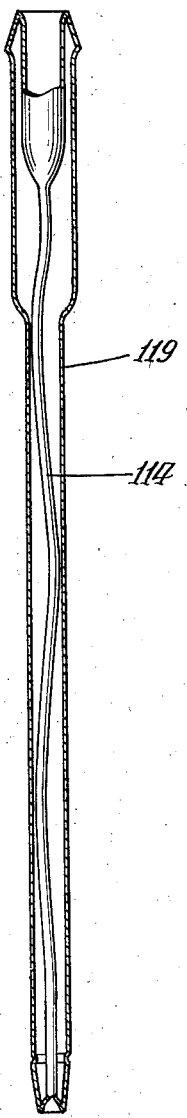

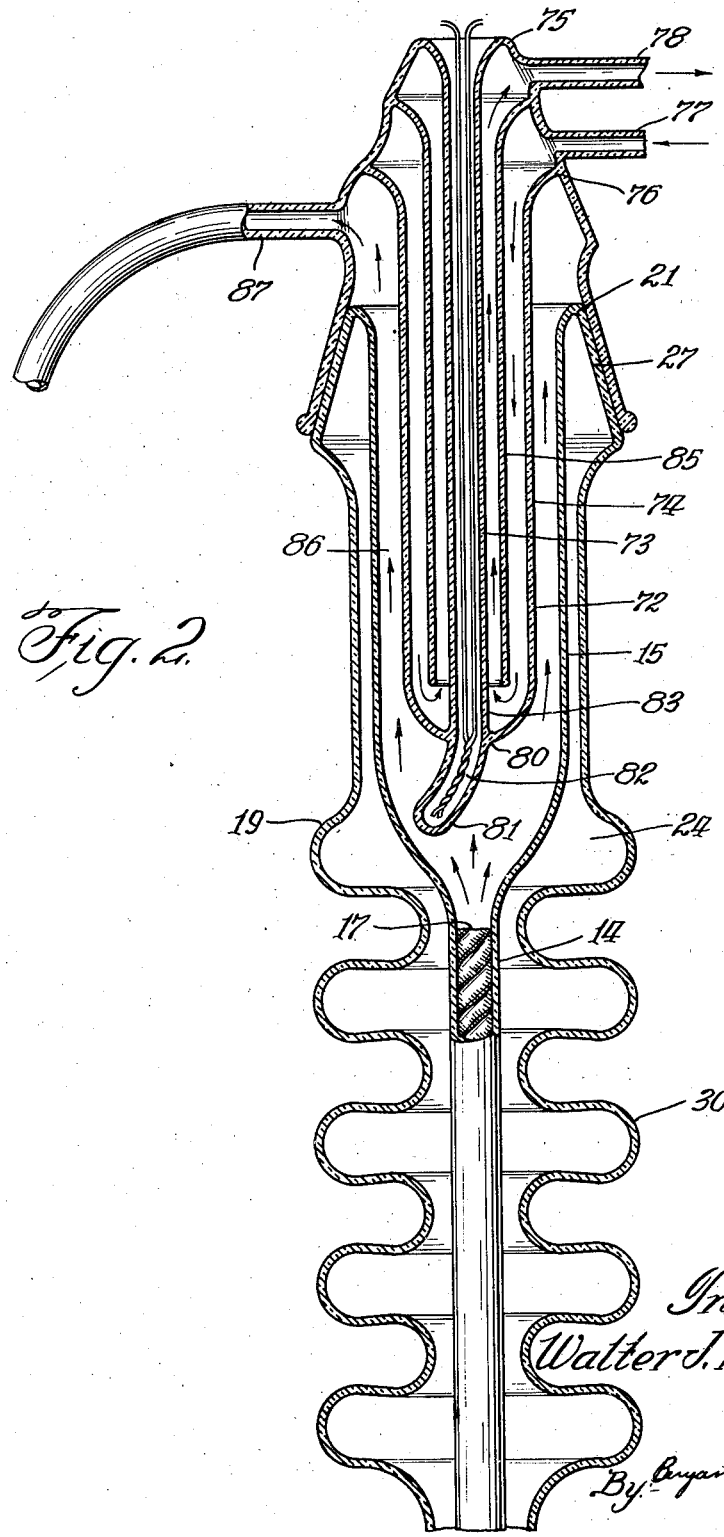

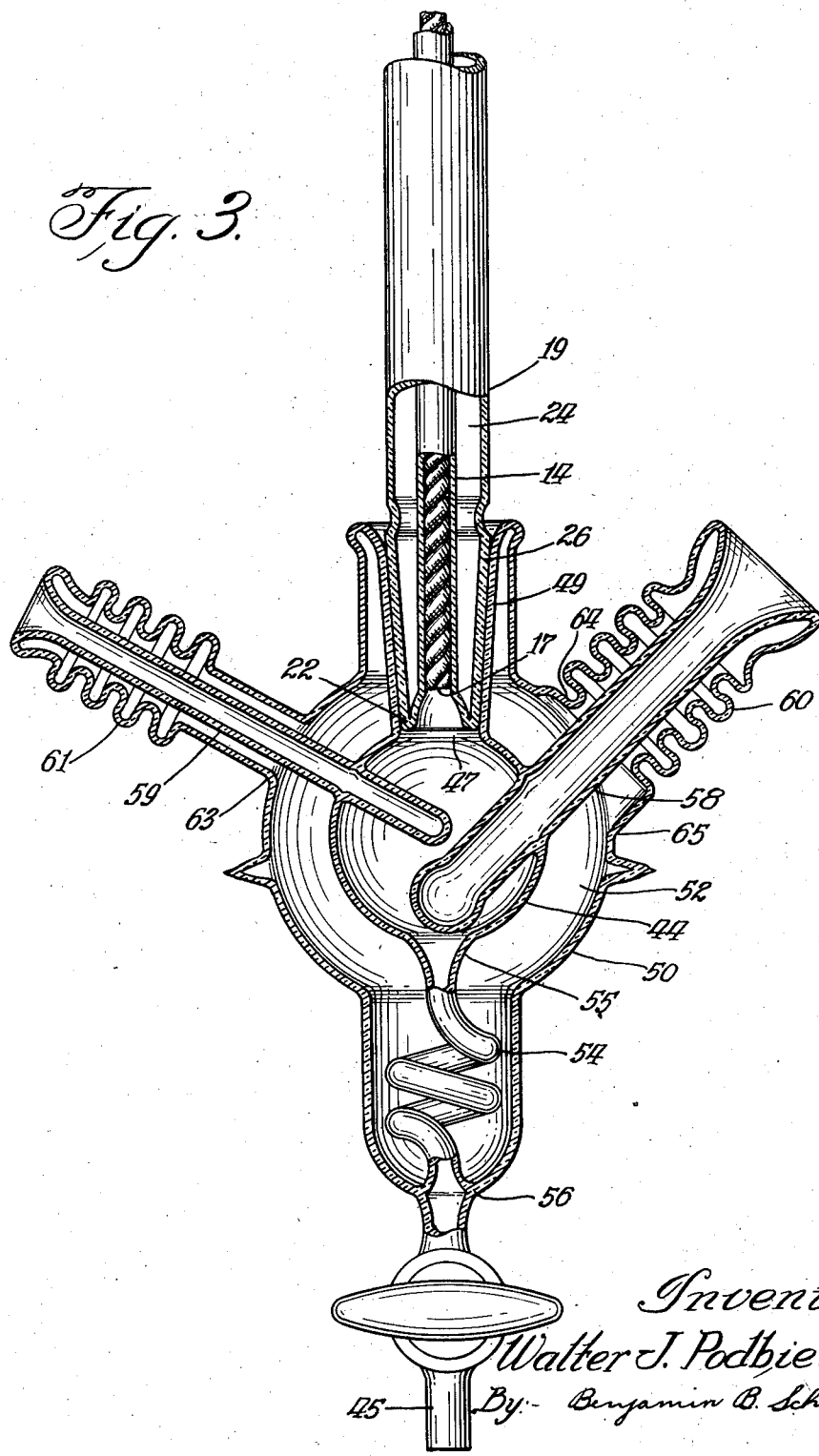

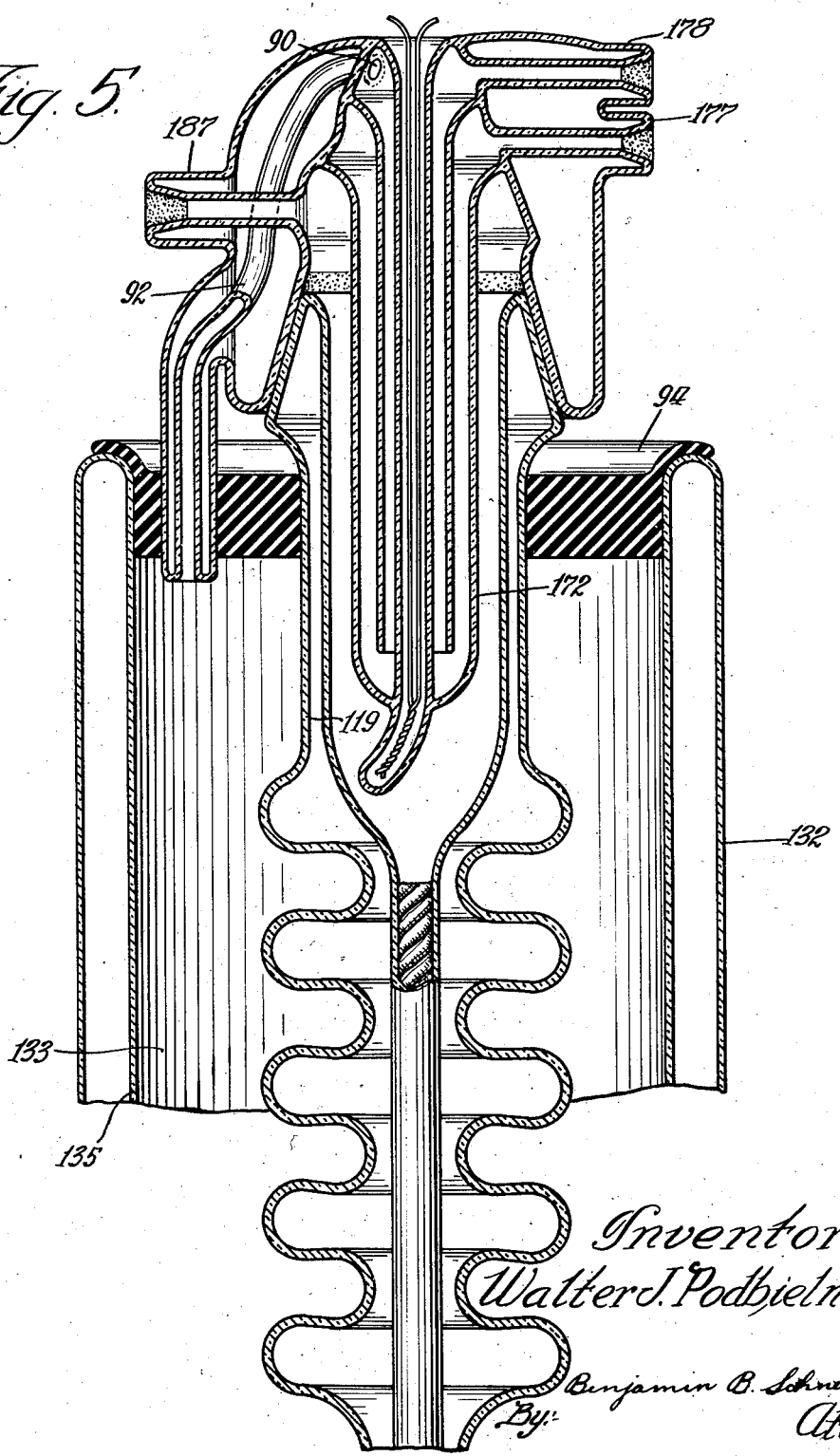

Patented May 7, 1946

2,400,021

UNITED STATES PATENT OFFICE 2,400,021

FRACTIONATING COLUMN

Walter J. Podbielniak, Chicago, Ill., assignor to Benjamin B. Schneider

Application September 2, 1941, Serial No. 409,227

4 Claims. (Cl. 196—98)

This invention relates to improvements in laboratory fractionating columns for either low- or high-temperature fractionations.

The laboratory fractionating columns of the prior art now in general use comprise a packed elongated distilling tube formed of a suitable low expansion, heat resistant glass such as "Pyrex" which is surrounded and thermally insulated by a vacuum jacket formed of a similar material. In my prior Patent No. 2,342,366, dated Feb. 22, 1944, I have shown and described improvements over these prior art columns, more particularly in the provision of a chamber between the distilling tube and the inner wall of the jacket in which liquid air vapors or other suitable cooling medium is introduced to prevent superheating of the distilling tube with respect to the natural or adiabatic temperature gradient of the column or other undesirable heat transfers which may affect the efficiency of operation of the column.

In accordance with the present invention, I have deevloped a substantially adiabatic distillation column which overcomes the objections to the prior art columns and which is capable of use for distilling any sample, even one ranging in composition from methane to lubricating oil. The column of my present invention comprises a distilling tube which is itself vacuum-jacketed and which is positioned within and in series with the outer vacuum jacket. This additional vacuum jacket serves to lessen and minimize the heat leakage of the outer large-bore vacuum jacket and, in many instance, eliminates the requirement for a miniature compensating heater in the annular space between the outer vacuum jacket and the distilling tube. Where the heater is desired, the additional vacuum jacket serves as a buffer against improper regulation of the heater. The additional vacuum jacket additionally serves to armor and protect the relatively weak distilling tube with its expensive packing and enables it to withstand shock without breaking.

A further novel feature of the column of my invention resides in the use of vacuum-jacketed ground joints between the bottom end of the distilling tube and the distilling flask to provide a leak-tight, easily detached, connection. By virtue of this novel, vacuum-jacketed joint, the lubricant seal normally therein is not affected by the temperature within the flask, whether it be low or high. The prior art lubricated ground joints freeze at liquid air temperatures and leak, and at high temperatures, the lubricant melts and becomes too fluid to accomplish its intended purposes.

My novel column possesses many other advantages which will be made apparent in the detailed description of several embodiments thereof in connection with the accompanying drawings. It is, of course, to be understood that my invention is not to be construed as limited to the details of the embodiments shown and described since these details may be varied without departing from the scope of my invention as defined in the appended claims.

Reference is made to the accompanying drawings wherein:

Figure 1 is a longitudinal elevational view of a distillation column embodying my invention, with parts in sections and with the cooling head and flask separated from the column proper;

Fig. 2 is an enlarged, fragmentary, longitudinal section through the upper portion of the vacuum-jacketed distilling tube and the cooling head, with parts in elevation;

Fig. 3 is an enlarged, fragmentary, longitudinal section through the lower portion of the distilling tube and the distilling flask, with parts in elevation;

Fig. 4 is a longitudinal section through a modified distilling tube, with parts in elevation;

Fig. 5 is a view similar to Fig. 2 of a modified distillation column in accordance with my invention; and Figs. 6 and 7 are longitudinal sections, with parts in elevation, through modified distilling flasks in accordance with my invention.

Referring to Figs. 1–3, there is shown a batch fractionating column comprising the column proper, a detachable distilling flask and a detachable cooling head designated generally by the numerals 10, 11 and 12, respectively. Distilling flask 11 may be supplied with liquid or gaseous samples to be analyzed as hereinafter described. In general, the sample taken into the column is subjected to rectification and fractionation, and vaporized and uncondensed constituents of the sample are conducted from the column for analysis as described in my prior patents No. 1,917,272, dated July 11, 1933, and No. 2,342,366, dated February 22, 1944.

Column proper 10 comprises an elongated distilling tube 14 which may be of any suitable dimensions, for example, 1 to 6 or more feet in length with an internal diameter varying from about 2.5 mm. up to 1 to 2 or more inches substantially throughout its length, depending upon whether it is desired to conduct low-temperature or high temperature fractionations. For low-temperature fractionations, the internal diameter of the tube may vary from about 2.5 to about 9 mm., although I prefer that it be from about 2.5 to about 4.5 mm. since within these limits capillary action is most effective in bringing about a more extended and intimate contact of the vapors and reflux without flooding or priming the tube. For high-temperature fractionations, the large sized tubes are used. The upper portion of the tube is enlarged as at 15 to receive cooling head 12 as hereinafter described.

In the elongated narrow portion of tube 14 is positioned a packing 17, such as a coil of small wire, for the purpose of bringing about an extended and intimate surface contact of the downwardly flowing reflux liquid and the rising vapors. The coiled wire packings utilized for this purpose may be, for example, those described in my prior Patent No. 1,917,272, although I prefer to use those described and claimed in my prior Patent No. 2,332,110, dated October 19, 1943.

Positioned about tube 14 is a tube or jacket 19 which is sealed to the upper and lower ends of the tube, as at 21 and 22, respectively. The air in space 24 between the jacket and tube is evacuated as completely as possible, to provide an effective thermal insulation substantially throughout the entire length of the distilling tube. If desired, the inner surface of jacket 19 may be silvered to enhance the insulating efficiency.

Jacket 19 is tapered inwardly at the lower and upper ends 26 and 27, respectively, to provide male joint members to which the cooling head 12 and distilling flask 11, respectively, may be joined. Preferably, the outer surfaces of the tapered joints 26 and 27 are ground as at 28 and 29, respectively, to insure a more perfect seal at the joints. A flexible bellows expansion joint 30 is formed in jacket 19 adjacent the enlarged end 15 of tube 14 to compensate for differential expansion of the jacket. Both the distilling tube 14 and the jacket 19, as well as the remainder of the column to be described, unless otherwise-noted, are formed of a suitable low expansion, heat resistant glass, such as that commercially known as "Pyrex," or of quartz or the like.

It will be apparent from the foregoing that joints 26 and 27 are insulated against heat transfers from the interior of the distilling tube as well as from the distilling flask and cooling head, thereby insuring that the lubricant normally used in the joints to effect sealing is not deleteriously affected either by heat or cold.

The vacuum-jacketed tube 14, as shown in Fig. 1, is surrounded and further insulated by an evacuated jacket 32, slightly spaced from jacket 19, as at 33. Jacket 32 extends substantially throughout the length of vacuum-jacketed tube 14, intermediate joints 26 and 27. Jacket 32 comprises an inner wall 35, having a flexible bellows joint 36, and a spaced outer wall 37, closed at the upper and lower ends as at 39 and 40, respectively. The lower end of inner wall 35 is flared outwardly towards closed end 40 to provide a space between the wall and jacket 19 which may be plugged with a glass wool plug 42 which frictionally engages the opposed surfaces and thereby supports jacket 32 about the vacuum-jacketed tube. Vacuum jacket 32 may be otherwise supported around the tube, if desired, as in my prior above-mentioned patent, for example, although I prefer the glass wool plug since it allows the passage of vapors or air therethrough for a purpose to be hereinafter described. Additional support for the vacuum jacket 32 may be provided, if desired.

The specific construction of vacuum jacket 32 forms no essential part of the present invention and, accordingly, any suitable vacuum jacket in series with the vacuum-jacketed tube, as described, may be used. I prefer, however, that the vacuum jacket be provided with a suitable, polished and/or silvered metal reflector as described more fully in my prior above-mentioned Patent 2,342,366.

The distilling flask 11 comprises a suitable vessel, such as the spheroidal-shaped vessel 44, into which the sample to be distilled is introduced, as through the stop-cock controlled conduit 45. The upper portion of vessel 44 is open, as at 47, to permit the vapors of the sample to rise out of the vessel into distilling tube 14. Projecting upwardly from vessel 44 about the opening 47 is a tubular-shaped, outwardly tapered wall 49 which forms the cooperating female joint for receiving male joint 26. The outer surface of wall 49 is so proportioned and ground as to insure a substantially perfect joint between the flask and tube. To insure against escape of vapors through the joint, lubricant may be supplied in the joint as is well understood.

Vessel 44 and projection 49 are surrounded by a wall or shell 50 and the air in intermediate space 52 is exhausted to insulate these parts from the exterior surroundings. It is thus apparent that the joint between the flask and tube is insulated, both from the interior and exterior surroundings.

The sample is brought into vessel 44 through a flexible, expansible, coiled conduit 54 which is sealed to the walls forming an opening in the bottom of the vessel, as at 55, and to shell 50 and inlet 45, as at 56. Extending into vessel 44 and through the walls thereof from opposite directions is an upwardly inclined heating well 58 and a similarly inclined thermometer well 59. Both wells are vacuum-jacketed, heating well 58 with the bellowed jacket 60 and thermometer well 59 with the bellowed jacket 61. These jackets are sealed into shell 50 as at 63, 64 and 65, thereby making the complete jacket or shell integral.

When using flask 11 for low-temperature distillations, the gas sample is introduced into vessel 44 and the gas is condensed by introducing liquid air or liquid air vapor into well 58. Thereafter, the liquid air is removed from the well and distillation is initiated by heating the sample. This may be accomplished by inserting a suitable heater into the well, for example, the cartridge type heater shown in my prior Patent No. 2,342,366. For high temperature distillations, where the sample is initially a liquid, oil or other suitable heat transfer medium is poured into well 58 and is heated by inserting a heater into the oil, thereby initiating distillation.

The heated vapors rise in the distilling tube and are cooled and condensed in the cooling head to provide reflux. The cooling medium may be, suitably, vaporized and/or unvaporized liquid air, water, or other cooling medium.

Cooling head 12 is a hollow body having a generally conical shape, the inner surface of which is ground as at 70 to receive the male joint 27. As is apparent, this joint is insulated from the tube. A vessel 72 into which the cooling medium is circulated is secured to the upper inner portion of the hollow body and depends therefrom into the enlarged portion 15 of the distilling tube. Vessel 72 is a double-walled, annular container, the inner wall being designated 73 and the outer wall 74. The inner wall is sealed at its top into the wall of the cooling head, as at 75, and the outer wall at its top also, as at 76. The inlet to the cooling vessel is at 77 and the outlet at 78. Vessel 72 is closed at the bottom about the inner wall 73 at a point above the bottom of the wall, as at 80. The inner wall 73 extending below the bottom of the cooling vessel is closed as at 81, thereby forming a well 83 in which a thermocouple 82 is positioned. If desired, a thermometer or other temperature measuring device may be inserted in well 83. A tubular baffle 85 extends into the cooling vessel to prevent short-circuiting of the cooling medium.

It is apparent from the foregoing that vapors from the distilling tube pass upwardly in space 86 between the cooling vessel and the enlargement 15 of the distilling tube and are exited from the column through conduit 87. These vapors may be analyzed as described in my prior above-mentioned patent, or otherwise treated. Since the utilization of these vapors forms no part of the present invention, no further description is deemed essential.

The modified form of vacuum-jacketed distilling tube shown in Fig. 4 is especially designed for low-temperature distillations. In this tube, the distilling tube 114 is bowed to provide sufficient slack to allow for contraction when in contact with relatively cold vapors. This bowing serves as an expansion joint and the principle thereof may be utilized in tubes of small internal diameters, say up to 15 mm., and, preferably, in tubes having internal diameters under about 5 to 6 mm. The vacuum jacket 119 is similar to jacket 19, heretofore described, except for the elimination of the expansible bellows. For both high and low temperature distillations, tube 114 may be, preferably, straight, and provided with an expansion joint, similar to joint 30, for accommodating expansion or contraction of the tube due to thermal changes.

The modified column shown in Fig. 5 is substantially the same as the column of Figs. 1 to 3 except that the cooling head is vacuum-jacketed about the female joint, the two outlets 178 and 187 and the inlet 177, as shown, and provision is made for the passage of some liquid air vapors from the cooling vessel 172 to the space 133 between the inner wall 135 of the outer vacuum jacket and the jacket 119 surrounding distilling tube 114. Thus, an additional outlet 90 is provided adjacent the top of cooling vessel 172 and a vacuum-jacketed conduit 92 carries liquid air vapors escaping through this outlet to space 133. A plug 94 of rubber or the like closes the top end of space 133. The free end of conduit 92 passes through this plug, thereby insuring that the liquid air vapors will pass downwardly through the space. These vapors may be vented from the bottom of the space through the glass wool plug 42, shown in Fig. 1, or otherwise, if desired.

The function of these liquid air vapors in the space above the vacuum-jacketed distilling tube is to prevent superheating of the tube, as described in my Patent No. 2,342,366. By virtue of the use of the vacuum jacket 119, the effect of the liquid air vapors on the distilling tube proper is modified and there is a softening of the shock on the tube as in my Patent No. 2,342,366 where the liquid air vapors are applied directly to the walls of the tube.

In Fig. 6 there is shown a modified form of distilling flask which is particularly adapted for low-temperature distillations and which may be substituted for flask 11. This flask comprises a suitable vessel, such as the spheroidal-shaped bulb 200, into which the sample to be distilled is introduced, as through the stop-cock controlled inlet conduit 201. The upper portion of bulb 200 is open, as at 247, to permit the vapors of the sample to rise out of the bulb into the distilling tube 14. Bulb 200 has the top thereof formed as a female joint 202, similar in design and construction to the corresponding joint section of flask 11, heretofore described. Both bulb 200 and joint section 202 are surrounded by a shell 203, and the space 204 therebetween is exhausted, thereby providing a vacuum-jacketed insulation for the sample vessel and joint section.

Inlet conduit 201 extends through shell 203 and terminates at the top part of bulb 200, as at 206, to form a supply conduit therefor. Under normal conditions of use, the liquid level in bulb 200 is well below point 206, to prevent reverse flow.

A second stop-cock controlled conduit 207, sealed to the wall of shell 203, as at 208, establishes communication between the bottom region of bulb 200 and a mercury bottle and graduated receiver (not shown) as in my Patent No. 2,342,366. As there described, the mercury is used to seal the sample in the bulb, and the receiver is used to receive the residue of the sample after distillation.

Bulb 200 has a reentrant heat control head 210, of generally sausage shape, carried by a central, vertical tube 211 passing through the wall of bulb 200 and extending downwardly toward a terminal ground joint 212. Surrounding the depending portion of tube 211 is an enclosing wall portion 213 sealed to vacuum jacket 203 to form a portion thereof. The bottom of wall 213 is sealed to an expansible bellows portion 214 and thence sealed to the free end of tube 211. As is evident from the drawings, the top end 216 of tube 211 to which head 210 is attached, extends well into the space occupied by bulb 200. By shaping the heat control head 210 to a sausage form, as shown, better heat exchange is promoted and reservoirs are provided in the lobes 217 for the purpose of pre-cooling the sample when the lobes contain liquid air.

After the gas sample is introduced into bulb 200, as described in detail in my Patent No. 2,342,366, the gas is condensed by introducing liquid air or liquid air vapor into head 210. Thereafter, the liquid air is removed from the head and distillation is initiated by inserting a heater into tube 211.

Fig. 7 shows a modified distilling flask which also may be substituted for flask 11. This flask comprises a distilling bulb 220 having a ground joint 221, a side ground joint 222 and a reentrant well 223. Joint 222 is designed to receive joint 225 which carries and seals off a short length of tubing 224, extending into the bulb for sample manipulation. Well 223 has a free open end providing for the disposition of a thermometer, heater, or the like.

While I have described my invention in connection with the details of construction of several embodiments, it is to be understood that these details may be varied and that my invention is not to be construed as limited to the specific embodiments shown and described, except as set forth in the appended claims.

I claim:

1. In analytical distillation apparatus, a distilling flask having a reentrant joint portion, a distilling tube having a complementary reentrant joint portion for detachably joining said elements, a second reentrant joint portion on said distilling tube, a cooling head having a complementary reentrant joint portion for detachably joining said cooling head to said tube, at least one of said joint portions and the complementary joint portion associated therewith being vacuum-jacketed.

2. In analytical distillation apparatus, a distilling flask having a reentrant joint portion, a distilling tube having a complementary reentrant joint portion for detachably joining said elements, a second reentrant joint portion on said distilling tube, a cooling head having a complementary reentrant joint portion for detachably joining said cooling head to said tube, both of the joint portions on said distilling tube and the complementary joint portions associated therewith being vacuum-jacketed.

3. In analytical distillation apparatus, a distilling flask having a reentrant joint portion, a distilling tube having a complementary reentrant joint portion for detachably joining said elements, a second reentrant joint portion on said distilling tube, a cooling head having a complementary reentrant joint portion for detachably joining said cooling head to said tube, the joint portion on said distilling flask and the complementary joint portion on the distilling tube associated therewith being vacuum-jacketed.

4. In analytical distillation apparatus, a vacuum-jacketed distilling flask having a reentrant joint portion, a vacuum-jacketed distilling tube having a complementary reentrant joint portion for detachably joining said elements, a second reentrant joint portion on said distilling tube, a cooling head having a complementary reentrant joint portion for detachably joining said cooling head to said tube, the joint portion on said distilling flask and the complementary joint portion on the distilling tube associated therewith being vacuum-jacketed.

WALTER J. PODBIELNIAK.